May 7, 1940. E. W. FLOSDORF 2,199,816
PRESERVATION OF BIOLOGICALLY ACTIVE SUBSTANCES
Filed Dec. 12, 1935 3 Sheets-Sheet 1

Fig.1.

INVENTOR
Earl W. Flosdorf
BY
ATTORNEYS

May 7, 1940.  E. W. FLOSDORF  2,199,816
PRESERVATION OF BIOLOGICALLY ACTIVE SUBSTANCES
Filed Dec. 12, 1935   3 Sheets-Sheet 2

INVENTOR
Earl W. Flosdorf
BY
ATTORNEYS

May 7, 1940.　　　　E. W. FLOSDORF　　　　2,199,816
PRESERVATION OF BIOLOGICALLY ACTIVE SUBSTANCES
Filed Dec. 12, 1935　　　3 Sheets-Sheet 3

INVENTOR
Earl W. Flosdorf
BY
ATTORNEYS

Patented May 7, 1940

2,199,816

UNITED STATES PATENT OFFICE 2,199,816

PRESERVATION OF BIOLOGICALLY ACTIVE SUBSTANCES

Earl W. Flosdorf, Ardmore, Pa., assignor to The Trustees of the University of Pennsylvania, Philadelphia, Pa., a corporation of Pennsylvania Application December 12, 1935, Serial No. 54,148

17 Claims. (Cl. 128—272)

This invention relates to improvements in the preservation of biologically active substances, such as sera, protein solutions, bacterial cultures, viruses and other labile biological substances; and includes an improved process for the treatment and preservation of biologically active substances by freezing the substance, dehydrating it from the frozen state under a high vacuum, and sealing the dried product under a high vacuum, the whole process being a continuous process and conducted under aseptic conditions in the final container in which the material is to be stored, and distributed; and the invention also includes the improved product produced by said process, in the form of the final container, containing the dried biologically active substance aseptically sealed under the original vacuum. The invention includes various features and improvements both in process and product, as hereinafter pointed out.

Biological products, as now commonly distributed and marketed, are packaged and sealed in a liquid state. The marketing of such products in their present unstable form involves a serious economic waste and loss, because of loss of efficacy in the product between the time of manufacture and the time of administration or use, and because a considerable proportion of such products are a total loss, having passed their date of expiration before use. Moreover, liquid biologically active substances cannot be safely distributed without the use of preservatives.

It has been proposed to improve the stability and keeping qualities of serum and other biological products by freezing the liquid products, i. e., aqueous products containing the biological substances in solution or in suspension, and drying the frozen products under a high vacuum, but such products have not, insofar as I am aware, been available on the market in clinically usable form nor in a form in which asepsis, without the use of preservatives, can be assured with certainty.

Dehydrated biological products in so-called "lyophile" form can readily be produced by the rapid freezing and rapid dehydration of frozen material in bulk, under a high vacuum. The serum, for example, can be frozen at about —78° C. in very large Pyrex or metal bulbs, connected to a large condenser contained in a refrigerant bath of solid carbon dioxide (Dry Ice) and acetone. The serum is kept in the frozen state solely by the rapid sublimation in vacuo, e. g., of 0.01 to 0.05 mm. mercury, of water vapor from its surface. The outer surfaces of the bulbs are surrounded merely by the air of the room at ordinary temperature which serves to heat the bulbs during the dehydration process. Such a process, for the treatment and preservation in bulk of large amounts of serum and other biological products has been developed by Dr. John Reichel of the Mulford Biological Laboratories.

Biological products produced in bulk by such processes are difficult to handle. In order to subdivide bulk-processed products into amounts and containers suitable for distribution and for clinical use of the product, the product has to be ground and weighed accurately and filled into containers. The lyophile product is hygroscopic and adheres readily to solid surfaces. It rapidly absorbs moisture when exposed to the air. The grinding of the product involves the danger of denaturation as well as absorption of moisture from the air and bacterial contamination. The accurate weighing and filling of the containers with the ground powder are also difficult steps to carry out without contamination with water vapor or bacteria. The difficulty of handling such bulk material has led me to the present process which avoids the production and handling of bulk material, and which enables the product to be directly produced, in the final market container, in which the entire process is carried out continuously, and with sealing of the final containers, containing the dried or dehydrated or lyophile product, under the original vacuum under which the product is produced.

The present process, carried out in the final container, and with sealing of the container under the original vacuum, insures that the product is protected from deterioration from ingress of air or moisture, or from micro-organisms or other contaminants. The process enables asepsis to be maintained throughout and without the use of preservatives, from the time the liquid serum or other biological product is introduced in the liquid state into the final container, until the container is finally sealed under the original vacuum.

I have also found that the production of the product directly in a final container presented various difficulties and problems. In order to produce, in a final market container suitable for distribution and use, amounts suitable for clinical use as full individual doses or multiples thereof, and to enable the product to be advantageously prepared, it is important to maintain a proper ratio between the volume of the original serum or other material in the container and the surfaces of the frozen material in contact with the container and the interior surfaces from which the evaporation or sublimation of ice occurs. At the end of the process, the sealed container contains the dehydrated or lyophile product in an undisintegrated state and with practically the volume of the original liquid, and, in general, with the same or a similar ratio of volume and surfaces, although the final product, because of its light and porous nature, has enormous interior surfaces.

I have also found it important, in order to produce clinically usable amounts of the product in the final containers, to have exhaust tubes, for exhausting the vaporized ice from the containers, which are properly proportioned, and which are sealed at the end of the process to hold the original vacuum; and I have devised new means for sealing the final containers, both when a glass exhaust tube is used, and when a rubber exhaust tube is used, whereby the exhaust tubes, while adequate to permit the rapid dehydration of the frozen product are nevertheless readily sealed to maintain the original vacuum.

The present invention also includes the final market containers, containing clinically usable amounts or sera, etc., or multiples thereof, sealed under the original vacuum under which the products were produced, and also having perforable membranes or closures to which sterile water can be introduced to restore the products to a liquid condition without destroying the vacuum until the water has been so introduced. The restoration of the products to a liquid state in this way enables a restored product to be produced in clinically useful amounts, or multiples thereof, and with assurance that the original product has not been contaminated in any way from the time the original liquid was inserted into the final container, until it is ultimately restored to a liquid state. Asepsis is thus maintainable throughout the process from the time the original serum or other product is inserted in the container until it is restored by the addition of the sterile water through the perforable closure by which the vacuum is maintained.

The process of the present invention, in its broader aspects, comprises introducing into the final market container, in which the product is to be marketed and distributed, an amount of the serum or other biological product which represents a clinical dose, or multiples thereof, or a definite unit or multiple unit amount of the material, the freezing of the material in the container, the drying of the product in a frozen state under a high vacuum with continuation of the process until the desired final dry product is obtained, and the sealing of the container while the high vacuum is maintained, thereby protecting the product from ingress of moisture, air, micro-organisms, or other contaminants.

In addition, the present process includes various specific features, hereinafter more fully described, and claimed.

The process which I have found particularly advantageous for the production of valuable products in clinically useful amounts is one in which a lyophilic product is produced by first rapidly freezing the product to a low temperature in the final container and insuring that the product is thoroughly frozen and is at a low temperature, rapidly dehydrating the product from the frozen state under a high vacuum, e. g., of less than 0.7 mm. mercury, and advantageously of 0.01 to 0.05 mm. mercury, and finally sealing the product in a container having a perforable closure which permits restoration by the addition of sterile water without destroying the original vacuum.

Certain features of the process, which can advantageously be used in producing the new product, and in carrying out the present process, as well as apparatus adapted for the practice of the process, are set forth in somewhat greater detail in my companion applications, Serial Nos. 54,149 and 126,056.

The invention will be further described in connection with specific illustrations thereof.

*The containers.*—The containers or receptacles which are used are of a size and shape which adapt them for containing the original liquid material, for permitting freezing of this liquid in the containers and for desiccation of the frozen material, and these containers are also to serve as the final containers for storage of the dry product and for restoring the desiccated material to its original liquid state. The containers should be of a size and shape which adapts them for use both as the containers of the material during the process, and as the containers of the final product.

In size, the containers should in general be at lease twice the size of the liquid serum or other material to be processed therein, so that the volume of material put into a container will not exceed about one-half the capacity of the container.

While containers as small as 2 to 5 ml. capacity are suitable and convenient for the preservation of materials in small amounts, in the case of such materials as virus suspensions or bacterial cultures, larger containers will in general be used, for example, up to containers of 50 ml. capacity for amounts of serum and similar products up to about 25 ml. in amount, which is the unit of such material generally processed in a single container for clinical use.

Larger containers can, however, be used, when desired, such as for multiple unit amounts of the product. Containers of about 200 ml. capacity, or about 8 ounces, are suitable for processing and preserving amounts of materials up to around 100 ml. In certain of its aspects, the invention includes the use of containers for desiccating volumes of as much as 100 milliliters to 1 liter or more, in a container of correspondingly increased size, since even such large containers can be effectively sealed under the original vacuum by the rubber tube sealing method of the present invention. But, in general, for clinically usable amounts of the biological materials, the individual unit will not exceed around 20 to 25 ml., and the containers need not, in general, exceed about 50 ml. capacity, when properly proportioned. For certain materials, however, such as breast milk, containers of around 200 ml. or 8 ounces capacity are suitable. Certain nursing bottles of the standard "clean easy" type, when constructed with a suitably shaped and proportioned neck, are suitable for use.

The following table shows typical container sizes, with an indication of the approximate container volume, the maximum volume of serum or other materials to be processed, and to be contained in the container, the body length, diameter and wall thickness, and the length and diameter of the necks of the containers to adapt them for the rubber stopper closures by which an effective vacuum is to be maintained in the final containers.

Table 1

| Approximate container volume | Maximum serum volume | Body length | Body outside diameter | Wall thickness | Neck length | Neck, inside diameter | |
|---|---|---|---|---|---|---|---|
| | | | | | | Large end | Small end |
| Ml. | Ml. | Mm. | Mm. | Mm. | Mm. | Mm. | Mm. |
| 100 | 50 | 185 | 35 | 2.0 | 15 | 15.2 | 13.7 |
| 50 | 25 | 110 | 28 | 1.5 | 15 | 15.2 | 13.7 |
| 25 | 13 | 80 | 22 | 1.5 | 15 | 15.2 | 13.7 |
| 12 | 6 | 60 | 20 | 1.2 | 15 | 15.2 | 13.7 |
| 6 | 3 | 45 | 15.5 | 1.0 | 15 | 15.2 | 13.7 |
| 2 | 1 | Sphere 22 | 22 | 1.0 | 10 | 5.4 | 4.5 |
| 2 | 1 | | 16 | 1.0 | 11 | 7.8 | 6.8 |

From this table it will be noted that the size and shape of the neck, which is to receive the rubber stopper, is the same for containers of considerable variations in volume. This is advantageous and it enables a standard rubber stopper to be used, and one which is of a size which enables the container to be rapidly evacuated through an opening of suitable size extending therethrough.

The shape and proportions of the containers are also important in processing and producing clinically useful amounts of the serum, etc., in the final sealed containers. For processing of the material in an effective and reliable manner, the size and shape of the containers are advantageously such that a layer of frozen material on the side of the cylindrical container while in a horizontal position, after the initial liquid is frozen, is not less than 3 mm. in thickness at the vertical diameter nor more than 15 mm.; and also such, as pointed out, that the volume of the frozen material does not exceed about one-half the volume of the container. The proper shape and proportions of the container also enable a desirable ratio to be obtained between the volume of the frozen material, during processing, the area of the frozen material in contact with the walls of the container, and the interior area of the frozen material which provides the evaporating surface during the dehydration of the frozen material. The final product, in the sealed evacuated container, will have in general the same volume and shape as that of the frozen product, although the final product will be a porous solid. In general, the ratio of the interior serum evaporating surface to the exterior surface of the frozen serum in contact with the walls of the container should be such that the vaporating surface has an area of at least about one-half that of the area of the frozen material in contact with the walls of the container. In general, also, there should be a minimum of about one to two square centimeters of internal evaporating surface per milliliter of serum frozen. These volume-area relations, which are important during the production of the product, are retained in general by the final product, even though it is no longer in a frozen condition, but instead in a light porous state.

*The container stoppers.*—While the invention, in its broader aspects, includes the use of an all glass container with an exhaust tube which is integral therewith and which is sealed to give an all glass sealed container; there are important advantages in utilizing a rubber stopper closure, when properly constructed and arranged, and this provides a new and valuable final product which not only contains the dehydrated product sealed under the original vacuum, but which also enables that product to be restored to a liquid state without breaking the vacuum.

Suitable sizes of rubber stoppers for use in containers such as are illustrated by Table 1 above, are given in the following table:

Table 2

| No. | | Body length | Neck diameter large end | Neck diameter small end | Diameter of exhaust hole |
|---|---|---|---|---|---|
| | | Mm. | Mm. | Mm. | Mm. |
| 1 | For carrying glass exhaust tube | 15.0 | 16.2 | 14.0 | 5.0 |
| 2 | Rubber exhaust tube-stopper | 16.0 | 16.8 | 15.1 | 6.5 |
| 3 | Small rubber exhaust tube-stopper | 10.0 | 9.0 | 7.5 | 4.0 |

The first two stoppers given in the table fit the same size neck, but with the first stopper allowance must be made for the fact that the glass tube, which extends through the stopper, is not compressible. The third stopper is similar to the second but smaller in size.

The second rubber stopper in the above table, referred to as rubber exhaust tube stopper, has an integral rubber tubing extension, extending from the stopper, which extension is about 32 mm. long, 9.5 mm. outside diameter, and 6.5 mm. inside diameter, the inside of the tube furnishing and forming an extension of the exhaust hole in the stopper itself. This special tube-stopper is molded in one piece. The wall thickness of the tubing is such as to permit effective clamping, by clamping devices attached thereto, to insure a permanent airtight vacuum seal.

In inserting the stoppers in the containers, they should be first lubricated with sterile distilled water or dilute antiseptic solution, since a stopper which does not require lubrication would not in general be sufficiently tight. The rubber stock of which the stoppers are made should be a fairly gum stock containing some filler and an anti-oxidant to aid the stopper in withstanding autoclaving. When the stoppers are autoclaved and sterilized before use, it is desirable to wrap them in a protective material. They should not be autoclaved while in place in the container neck since the heating of the rubber while subjected to pressure interferes with obtaining the necessary tight fit and tends to reduce its outside diameter and destroy the vacuum tightness of the fit.

For high vacuum tightness, with a rubber stopper, a great compression of the rubber is essential. This is obtained by tapering both the neck of the container and the stopper, and by lubricating the stopper before it is inserted, so that there is a maximum of compression on the entire length of the neck surface. The upper limit of compression is that which will not squeeze the holes to too small a diameter and which will not cause undue distortion of the stopper because of unequal stresses over its length. This procedure also tends to reduce the porosity of the rubber.

*The exhaust tube.*—In order that the container may be effectively sealed without destroying the original vacuum, at the end of the process, it is essential that the exhaust tube used be one which permits such sealing. But the exhaust tube must also serve the purpose of permitting the escape of water vapor during the dehydration of the frozen product. The importance of having a large exhaust tube, even on a relatively small container, will be appreciated from the fact that 25 ml. of water or ice produce approximately 236,000 liters of vapor at 0.1 mm. mercury pressure and at 0° C.; while the initial rate of evaporation from an amount of frozen material containing about 25 ml. of ice is such that as much as 400 liters of vapor must escape per minute from each container at such pressure. The exhaust tube must be sufficiently large to permit sufficiently free escape of vapor but nevertheless small enough to permit easy sealing.

In the case of a glass exhaust tube the bore of the tube must be sufficiently large to permit free evaporation and removal of water vapor from the frozen product, while the size of the bore and wall thickness must also be such as to permit sealing of the tube by fusing the glass with a torch, at the end of the process, in order to seal the container under its original vacuum.

It has been considered that glass tubes of larger than 3 mm. internal diameter cannot be sealed easily under a high vacuum without the aid of special electrical heating devices for each tube. I have found, however, that tubes of materially larger size, when made of Pyrex glass of proper wall thickness, can be effectively sealed with the use of a cross-fire burner, and that such tubes can be sealed with sufficient facility so that as many as five tubes can be sealed per minute where the bore is materially larger than 3 mm.

For containers up to about 25 ml. serum content, a uniform bore of about 3 mm. is the minimum size that is satisfactory in the exhaust tubes used. For containers from about 25 ml. up to about 100 ml. content of frozen material, an exhaust tube having a minimum uniform bore of from 4.0 to 5.0 mm. bore and 1.0 mm. minimum wall thickness is needed.

The exhaust tube is advantageously made L-shaped, with one arm about 50 mm. long which extends through the rubber stopper into the container and the other arm about 80 mm. long which is used for attachment to the manifold. The L-shape of the exhaust tube serves to protect the contents of the container during freezing and also assists in maintaining asepsis during processing.

Where the containers have more than about 100 ml. of material per container, a somewhat larger exhaust tube is necessary, such as tubes of 7.5 to 8.5 mm. bore having a short constriction of e. g. 4 mm. inside diameter which is only long enough to permit effective sealing. Such a larger exhaust tube is well adapted for use with 100 ml. or more of the material to be processed.

The provision of glass exhaust tubes of properly regulated size and construction enables the container to be directly sealed at the end of the process, without the necessity of destroying the vacuum and then restricting the tubes and re-evacuating before sealing.

When the integral rubber-tube-stopper is used, having a rubber exhaust tube integral with the stopper, this tube is attached to an L-shaped glass exhaust tube to permit connection with the exhaust manifold. The length of the rubber tube integral with the stopper, and the length of the arm of the glass L-tube to which it is attached, will together equal approximately the length of the corresponding arm of the L-shaped glass tube which is used without the rubber tube extension.

When the rubber-tube-stopper is used, the container is finally sealed, at the end of the process, by compressing it sufficiently between parallel metal clamping surfaces under a sufficient pressure to hold a permanent vacuum seal on the tubing. The metal clamp must be of sufficient strength and rigidity to hold the rubber permanently compressed. I do not in this application claim specifically this new rubber-tube-stopper, or the container sealed with such a stopper, as these are claimed in my application Serial No. 106,105.

*Freezing of the material.*—After the liquid material is charged into the container, and the container is closed, it is then immersed in a freezing bath to freeze the liquid material. It is important, as already pointed out in connection with the containers, to have a proper ratio between the volume of the frozen material and the interior and exterior surfaces of the material. With cylindrical containers of from 5 to 50 ml. capacity, and of the shape and proportions above described, the product is readily frozen while the container is on its side in a freezing bath, and the necessary relation of volume and surface is readily established. With a cylindrical container, where the amount of material is greater than about 20 ml., it is advantageous to impart a gentle rocking motion during the freezing, while the container is in a horizontal position, in order to increase the evaporation surface. With containers of about 200 ml. or 8 ounce capacity, the serum should be frozen around the entire circumference of the bottle in order to obtain a better ratio of surface area and volume.

A number of the filled small containers can be readily frozen at one time by immersing them in a freezing bath in a horizontal position, but without permitting the liquid contents to extend into the outlet opening. The L-shaped exhaust tube prevents the freezing mixture from entering the containers and facilitates rocking of the containers when desired.

I have found a freezing bath or mixture of Dry Ice (solid carbon dioxide) suspended in methyl Cellosolve (the methyl ether of ethylene glycol) particularly effective as a freezing bath for freezing the serum, etc., in the individual containers, and the use of such a bath, at around −78° C., results in rapid and almost instantaneous freezing of the product, which is important in obtaining the final lyophile product.

*Dehydration of the product.*—After the freezing of the material in the container, this container is attached to an exhaust mechanism where a large number of the individual containers can be simultaneously subjected to a high vacuum, e. g., between 0.01 and 0.05 mm. mercury, to effect distilling or subliming of ice therefrom without melting the rapidly frozen product. An apparatus and procedure by which the individual containers can be rapidly attached to the manifold of a vacuum apparatus, the dehydration carried out until the final dry product is obtained in the container, is hereafter described in connection with the accompanying drawings.

*Sealing of the final container.*—At the end of the drying or dehydrating treatment, when the final dry or lyophilic product has been produced in the container, the container is then sealed while the original high vacuum is maintained, so that the dry stable product will be protected from ingress of air, moisture, micro-organisms or other contaminants.

The sealing of the container, where it has a glass exhaust tube, is accomplished by fusing of the tube. By careful slow and even heating of the glass tube on all sides at once while pulling on the glass, an excellent seal of Pyrex exhaust tubes can be obtained with tubes up to 5 mm. or even up to 9 mm. internal diameter, or with larger tubes preferably having a small short constriction therein.

With tubes having the integral rubber stopper and tube, the container is sealed, while the original high vacuum is still maintained, by attaching a clamp to the rubber tube, a short distance from the stopper, and with the use of a clamp sufficiently strong and attached with sufficient pressure, to keep the rubber compressed sufficiently to insure maintaining a vacuum in the container.

Where rubber stopper closures are used, the container can be further protected by coating or covering the entire rubber part with a liquid sealing cement, which retains its flexibility and imperviousness when dry, and aids in preventing deterioration of the rubber, as well as preserving the vacuum.

This sealing of the final container under its original vacuum by compression of a suitable exhaust tube, is applicable not only to small market containers of the kind previously described, but to much larger containers as well, since tubes of larger diameter and of sufficient wall thickness can readily be made of soft rubber to withstand the high vacuum and to permit sufficient compression to seal the container. For example, in sealing a container containing up to 20 or 25 liters of material per container, a rubber tube may be used which is as much as 2 inches in diameter, internally, and with a thickness of a wall of about 1 inch. In this case strong metal clamps are required for making a vacuum-tight seal, for example, steel bars which clamp together with a space between them of one and one-half inches or even 1 inch, so that the soft rubber of the tube is very highly compressed by the clamps used. Rubber of a relatively soft variety should be used for such tubes.

*Testing of the finally evacuated container.*— If the final container is not properly sealed, and if the vacuum is destroyed, there is danger of contamination; but when the container is sealed under the original vacuum, under which the product was produced, and the seal is properly made, the product will be retained without danger of contamination until it is to be used.

It has been found desirable to hold the containers for a week, after they have been sealed off, and then test them to see if their vacuum has been maintained. If a powerful high frequency electrical discharge coil is touched to the outside of each tube, a violet glow will appear in the tube if the vacuum is satisfactory. If the vacuum is maintained for one week, the sealing can be considered satisfactory, and the product properly protected under its original vacuum.

*Restoration of the product.*—By sealing the product under its original vacuum, under which it is produced, and by using a rubber stopper closure which can be perforated with a hypodermic syringe needle, sterile water or physiological saline solution can be admitted to the container, while the vacuum is still maintained, and the product can thereby be wet with water. The vacuum in the container will aid in drawing in the water. After thorough wetting of the entire surface of the porous solid material with the proper amount of water, air is admitted by disconnecting the syringe from the needle, and this air pressure forces the water into the porous material and promotes its rapid dissolution.

The invention will be further described in connection with the accompanying drawings, which illustrate in a somewhat conventional and diagrammatic manner, an apparatus adapted for the practice of the process of the invention and for making the product of the invention.

In the accompanying drawings.

Figure 1:
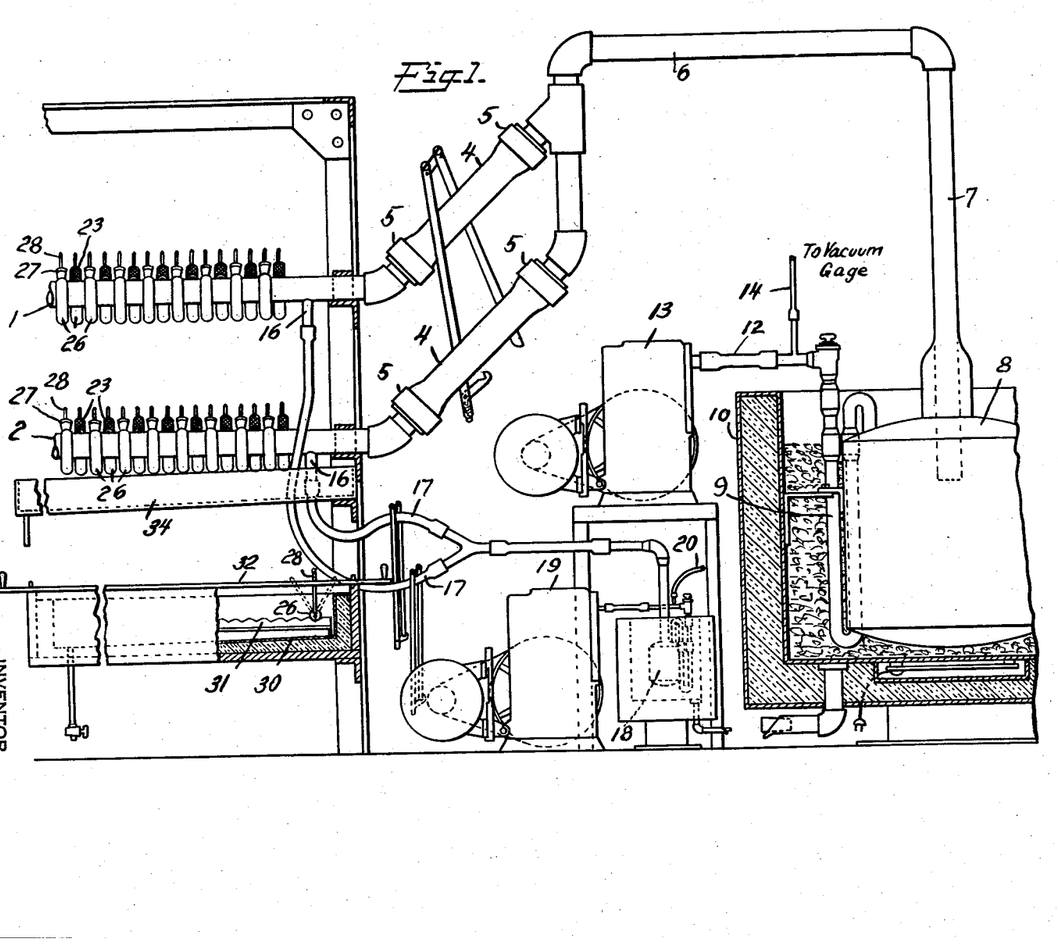
Fig. 1 shows the general arrangement of the apparatus, with a plurality of the individual containers attached thereto.

The apparatus illustrated has a plurality of manifolds, of which two are shown, 1 and 2, each having a considerable number of outlets 3 for the attachment of the exhaust tubes of the containers. Each manifold may, for example, have outlet connections for a hundred individual containers.

The two manifolds shown are connected by large flexible soft rubber tubes 4 to a header 6, clamps 5 clamping the large thick rubber tubes to the manifolds and to the header. From the header 6 the pipe 7 leads to condenser 8 and the outlet of this condenser leads to a supplemental condenser 9, both enclosed within a surrounding container 10 and adapted to have a refrigerant, such as a mixture of Dry Ice or solid carbon dioxide and methyl Cellosolve within the container and around the condenser, and a cover for the container.

From the supplemental condenser a vacuum line 12 leads to the vacuum pump 13. A separate line 14 leads to a vacuum gauge, e. g. of the McLeod type (not shown) for indicating the vacuum in the apparatus.

The apparatus illustrated is also provided with an auxiliary condenser and vacuum pump, having separate connections to the header. In the apparatus shown, the manifold has a small side connection 16 connected by a flexible rubber pipe 17 to the auxiliary condenser 18 which in turn is connected with the auxiliary vacuum pump 19. Separate lines 20 lead to an auxiliary pressure gauge or vacuum gauge (not shown).

By the use of powerful clamps, such as are illustrated in Fig. 1 as attached to the rubber tubes 17, these tubes, or either of them, or either or both of the large tubes 4, can be shut off. One of the clamps, in an open position, is shown supported on one of the large rubber tubes 4. By disconnecting one manifold from the large condenser, and connecting it with the auxiliary condenser and pump, one manifold can be disconnected from the main system without interfering with the maintenance of a high vacuum on the rest of the system. When the manifold has the individual containers connected thereto, the vacuum can be applied to the auxiliary condenser and pump until the pressure reaches that of the rest of the system, when this manifold can be connected with the rest of the system.

The arrangement is such that one or more of the manifolds can be connected or disconnected as desired without interfering with the operation of the process and the maintenance of the vacuum on the rest of the system.

This apparatus, and the method carried out in it, are more particularly set forth in my companion applications Serial Nos. 54,149 and 126,056.

Figures 2, 3:
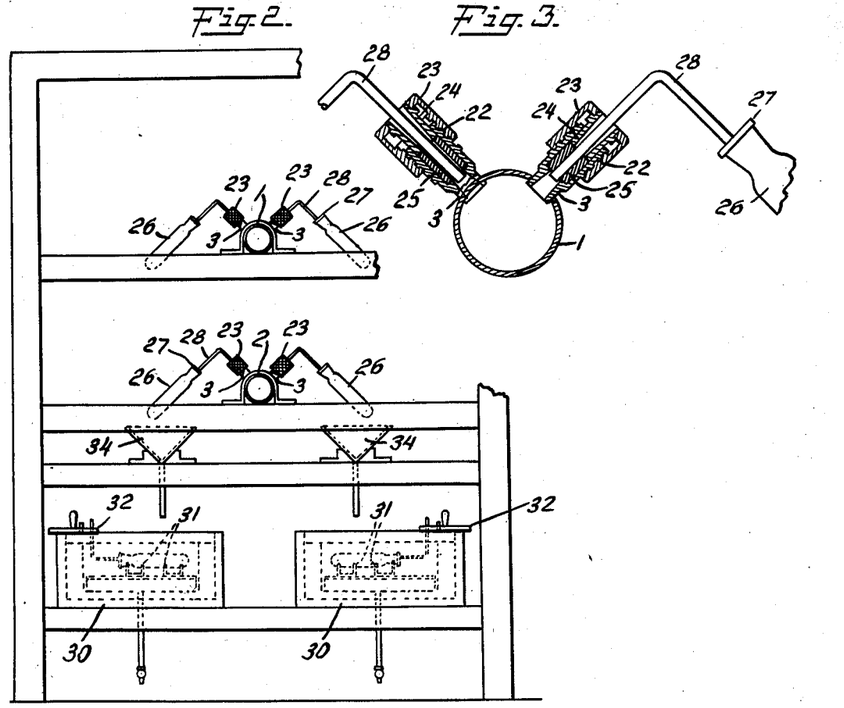
Fig. 2 is an end view of part of the apparatus showing the manifold, freezing pan and drip pan, etc.
Fig. 3 shows an arrangement for quickly attaching exhaust tubes of the containers to the manifold.

A preferred construction for connecting the exhaust tubes of the individual containers to the manifold is shown in Fig. 3. Each of the individual outlet pipes 3 from the manifold is shown as having quick acting threads 22 with which a clamping nut 23, having similar quick acting threads, cooperates. Within the extension 3 is a rubber tube or sleeve 25 and within the clamping nut 23 is a metal sleeve 24, the arrangement being such that as the nut is screwed down on the tube 3 it quickly compresses the rubber tube or sleeve 25 between metal sleeve 24 and a projection on the tube 3. The connection shown enables a large number of individual containers to be rapidly connected, since all that is necessary is to insert one of the exhaust tubes inside the projecting member 3, and then by a quick turn on the nut 23 the rubber tube or sleeve is compressed tightly against the tube and holds it with a vacuum tight connection. The individual containers 26 shown attached to the manifold have rubber stoppers 27 therein and glass L-shaped exhaust tubes 28, with the end of the exhaust tubes extending into the quick attaching device shown in Fig. 3.

Figure 4:
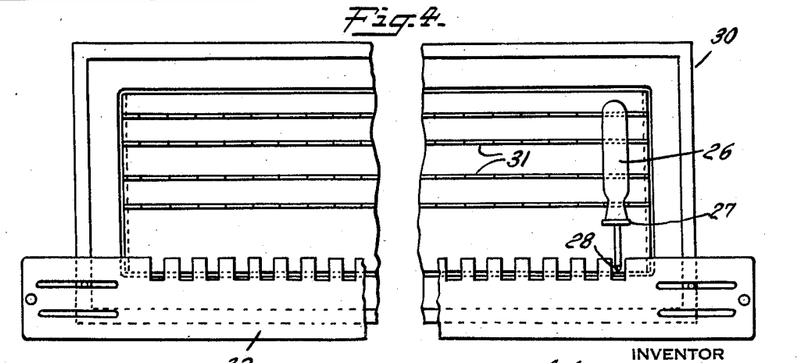
Fig. 4 is a sectional view showing the freezing trough and a container therein.

A suitable freezing trough, for freezing the serum or other biological material in the individual containers, is shown in Fig. 4, the trough 30 having individual supports 31 for the individual bottles or containers, and a rocking device 32 by means of which, if desired, the containers can be rocked back and forth by movement of the upwardly projecting portions of the L-shaped exhaust tubes. Each of these tubes has a plug of cotton in the end to protect the contents from contamination. This plug is removed when the container is attached to the manifold. A drip trough 34 is arranged to collect any liquid which drips from the containers, when they are removed from the freezing bath and attached to the manifold, as well as water which drips from the containers when the ice, formed on the tubes during the drying operation, is melted near the end of the operation.

Figures 5, 6, 7, 8, 9:
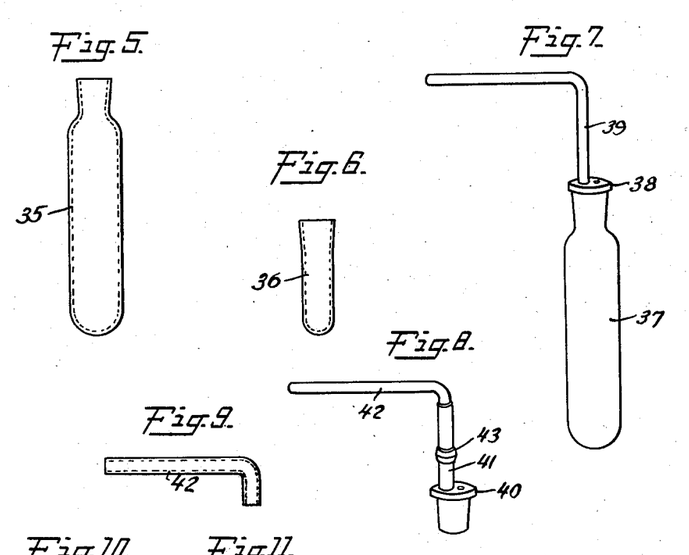
Figs. 5 and 6 show two forms of containers, before use.
Fig. 7 shows an assembly of container, rubber stopper, and glass exhaust tube, before use.
Fig. 8 shows one form of the integral rubber tube stopper, with a glass exhaust tube connected to the rubber tube.
Fig. 9 shows a glass exhaust tube for use in the assembly of Fig. 8.

Containers 35 and 36, such as previously described and referred to in Table I, are shown in Figs. 5 and 6.

In Fig. 7 the container 37 is shown as having a stopper 38 therein from which extends a glass exhaust tube 39.

In Fig. 8 the stopper 40 is shown as having an integral rubber tube 41 extending therefrom which in turn is connected with a glass exhaust tube 42 (shown separately in Fig. 9). A metal clamp 43 is shown in place around the rubber exhaust tube, but the clamp has not been compressed to seal the tube.

Figs. 10, 11, 12 and 13 show four final containers sealed to maintain the vacuum in them.

Figure 10:
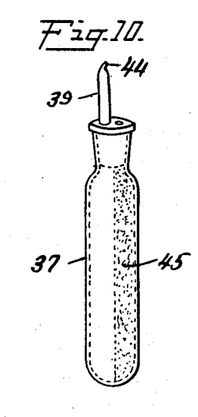
Figs. 10 to 13 show different forms of the final containers with the dry material in them and sealed to maintain the original vacuum.

Fig. 10 shows a final container such as illustrated in Fig. 7, but with the glass exhaust tube sealed, and with the container containing the final dry or lyophilic product indicated at 45. The glass seal is indicated at 44.

Figure 11:
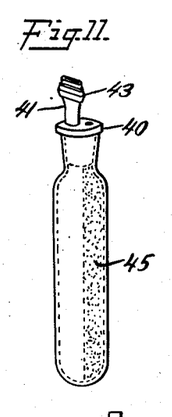

Fig. 11 shows a similar container but with the combined rubber stopper tube closure of Fig. 8, with the clamp 43 compressed to seal the tube, and with the tube cut off above the clamp.

In Figs. 10 and 11 the final product, as will be noted, occupies about one-half or somewhat less of the space in the cylindrical container, and is at one side. The space it occupies is practically that of the original frozen material.

Figure 14:
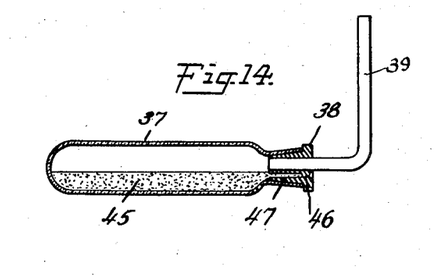
Fig. 14 shows one of the final containers with parts broken away.

The rubber stopper shown in Figs. 7 and 10 is shown in section in Fig. 14. In addition to the hole for the glass exhaust tube, it has another hole extending part way through the stopper and indicated at 47, leaving a thin section 46 through which a hypodermic needle can be inserted when it is desired to restore the product by the addition of water thereto. The stopper shown in Figs. 8 and 11 has a similar thin portion for facilitating the introduction of liquid. This portion of the rubber stopper is nevertheless sufficient to maintain the vacuum until it is punctured or perforated.

Figure 12:
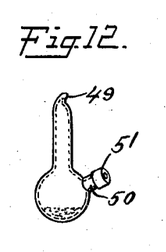
Figure 13:
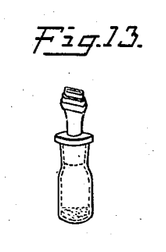

Figs. 12 and 13 show somewhat different forms and arrangements of the containers. In Fig. 12 a small round glass container is shown with an integral glass tubular extension sealed off at 49, and with a side extension 50 having a perforable rubber stopper 51 therein.

Fig. 13 shows a smaller final container similar to that of Fig. 11, but in this case the amount of material is so small that it may all be contained in the bottom of the container.

Fig. 14 shows the final sealed container of Fig. 10, with parts broken away to show the stopper construction and the lyophilic product in the container.

In the carrying out of the process, with the apparatus illustrated, the liquid material such as serum, etc., to be treated and preserved, is introduced into the final container in a liquid state, and is frozen therein in such a way as to preserve a proper ratio of volume and surface, as previously described.

The individual containers are then connected to the manifold and are subjected to a high vacuum with the result that the ice which they contain is sublimed or evaporated without melting the product, and the process is continued after the ice has been removed and the product has increased in temperature to around room temperature, until the water has been reduced to the proper extent, for example, to less than 1%, as determined by drying in an oven at 110° C.

The drying of the product is advantageously carried on in the manner more particularly described and claimed in my companion application Serial No. 54,149.

When the drying operation has been completed, and the product within the individual containers has been reduced to the desired dry condition and moisture content, the individual containers are sealed while they are still maintained under a high vacuum. With the containers having a glass exhaust tube, the sealing is readily carried out with a suitable double blast jet. With the rubber exhaust tube stopper, sealing is effected by applying a clamp to the rubber tube under sufficient pressure to insure a suitable vacuum seal. When the individual containers have been thus sealed, the vacuum in the apparatus can be released. By the proper use of clamps, a single manifold can be disconnected from the system without destroying the vacuum on the remainder of the system.

In this way successive manifolds can be connected with their proper number of individual containers, and a vacuum established by the supplemental exhausting system, and this manifold can then be connected with the main system. As each manifold needs to be disconnected, that manifold can be similarly disconnected, and again connected to the supplemental exhausting system and the vacuum released in that manifold after the containers have been sealed, without interfering with the operation of the rest of the system.

In this way, and by providing a sufficient number of manifolds, and a sufficient number of individual containers, it is possible to manufacture the individual containers uniformly in commercial quantities and insure that the individual containers will contain the proper amount of biologically active material, preserved in an uncontaminated state and with practically its original properties when restored.

The products produced and preserved according to the present invention occupy essentially the same volume as the original serum or other product from which they were prepared; but they are in a highly porous condition and, when properly prepared and in a lyophilic state, retain their original biological properties for long periods of time. In case of serum, its content of antibodies and complements suffers no detectable loss in processing, and the rate of subsequent deterioration is reduced to a small fraction of that in the liquid state. The porous lyophile product, on addition of distilled water, re-dissolves with remarkable ease and completeness; and this restoration can be readily accomplished in the evacuated container without any danger of contamination of the material prior to its restoration.

I use the term "lyophile" in the manner in which this term is used by Dr. John Reichel, and with a somewhat special connotation, to emphasize a noteworthy characteristic of the product, namely, its remarkable solubility. This solubility appears to be a result both of the unaltered lyophilic properties of the serum proteins and of the physical structure of the porous solid.

The present invention is applicable to a wide range of biological products, including sera, viruses, and vaccines of various kinds as well as protein solutions and other labile biological substances. Various protein substances can be satisfactorily processed and preserved. Human milk, for example, can be readily preserved in containers of nursing bottles or larger size. Various proteins have also been preserved in lyophilic form, including egg albumen, serum albumen, lens protein, serum pseudo globulin, and euglobulin. Even such labile substances as fibrinogen and prothrombin have been satisfactorily preserved and have retained their solubility and biological activities over long periods of time.

I claim:

1. The method of preparing and preserving biological substances which comprises introducing biological substances in a liquid state into a final container adapted for the distribution and retention of the product, freezing the material to convert it into a solid frozen condition, dehydrating the product from its frozen state without melting thereof under a high vacuum and sealing the resulting dried product in such container while under such high vacuum and without destroying the vacuum, whereby the dried product is sealed under the original vacuum for storage and keeping purposes and until it is to be restored for use, and whereby asepsis is maintained during the processing and storage of the material and deterioration and contamination are prevented.

2. The method of preparing and preserving lyophilic biological substances which comprises introducing biological substances in a liquid state into a final container adapted for the distribution and retention of the product, rapidly and thoroughly freezing the material by subjecting the same to a low temperature, around —78° C., dehydrating the product from its frozen state without melting thereof under a high vacuum and sealing the resulting lyophilic product in such container while under such high vacuum and without destroying the vacuum, whereby the lyophilic product is sealed under the original vacuum for storage and keeping purposes and until it is to be restored for use, and whereby asepsis is maintained during the processing and storage of the material and deterioration and contamination are prevented.

3. The method of preparing and preserving biological substances in small predetermined amounts suitable for use for clinical purposes which comprises introducing such amount of the biological substance in the liquid state into a small container adapted for the storage of the product until required for use, freezing the material therein to convert the same into a solid, frozen condition, dehydrating the product from its frozen state under a high vacuum without melting the product until a dehydrated product is obtained and sealing the small individual containers under a high vacuum and without destroying the original vacuum under which the products are produced, whereby the small predetermined amounts are preserved and stored under the original vacuum until required for restoration and use, and whereby asepsis is maintained during the processing and storage of the material and deterioration and contamination are prevented.

4. The method of preparing and preserving lyophilic biological substances in small predetermined amounts suitable for use for clinical purposes which comprises introducing such amount of the biological substance in the liquid state into a small container adapted for the storage of the product until required for use, rapidly and thoroughly freezing the material therein by subjecting the same to a low temperature, around —78° C., dehydrating the product from its frozen state under a high vacuum without melting the product until a dehydrated product is obtained and sealing the small individual containers under a high vacuum and without destroying the original vacuum under which the products are produced whereby the small predetermined amounts are preserved and stored under the original vacuum until required for restoration and use and whereby asepsis is maintained during the processing and storage of the material and deterioration and contamination are prevented.

5. In the production of dry biological products by freezing the biological product from a liquid state and dehydrating the frozen product under a high vacuum without melting the frozen product, the improvement which comprises carrying out the process in a large number of small individual containers containing small, predetermined amounts of the material suitable for clinical purposes and sealing the individual container while still under a high vacuum and without destroying the original vacuum under which they were produced, whereby asepsis is maintained during the process and during the subsequent storage of the product and deterioration and contamination are prevented until the product is to be restored for use.

6. In the production of lyophilic biological products by rapidly and quickly freezing the biological product from a liquid state by subjecting it to a low temperature of about —78° C. and dehydrating the frozen product under a high vacuum without melting the frozen product, the improvement which comprises carrying out the process in a large number of small individual containers containing individual units of the material suitable for clinical or similar purposes and sealing the container under a high vacuum and without destroying the vacuum, whereby asepsis is maintained during the process and during the subsequent storage of the product and deterioration and contamination are prevented until the product is to be restored for use.

7. The method of restoring dry or lyophilic biological substances to a liquid state which comprises adding water to the evacuated container containing the product produced as described in claim 1 without destroying the vacuum before the water is added for the restoration.

8. As a new article of manufacture a small, sealed evacuated container of generally cylindrical shape containing a solid, lyophilic bioligically active substance, said container having a neck and tightly fitting rubber stopper closure for said neck to maintain the vacuum therein, said closure permitting the passage of a tubular member therethrough for the addition of water to restore the product to a liquid state without destroying the vacuum, and the solid, lyophilic biological substance therein having a volume corresponding generally to the volume of the initial liquid substance and in a form extending longitudinally in the cylinder and occupying around half of the total volume of the cylinder.

9. As a new article of manufacture, a small individual glass container such as defined in claim 8, said container containing up to 25 cc. of material in a container of around 50 cc. capacity and having a protruding flame-sealed tubular member with a minimum internal bore of about 3.0 mm. communicating with the interior thereof.

10. As a new article of manufacture, a sealed evacuated container containing lyophilic biologically active substances produced therein and resulting from and having the properties of products produced by rapidly freezing the liquid biological substance to a low temperature and dehydrating the frozen product without melting under a high vacuum, said evacuated container containing the lyophilic material uncontaminated by moisture, micro-organisms and other substances at any time after the freezing of the material and the sealing of the product under a vacuum, said container having a perforable stopper and a protruding flame-sealed tubular member of glass having a low coefficient of thermal expansion of the order of that of Pyrex glass communicating with the interior thereof.

11. As a new article of manufacture, a sealed evacuated container containing lyophilic biologically active substances produced therein, and resulting from and having the properties of products produced by rapidly freezing the liquid biological substance to a low temperature and dehydrating the frozen product without melting under a high vacuum, said evacuated container containing the lyophilic material uncontaminated by moisture, micro-organisms and other substances at any time after the freezing of the material and the sealing of the product under a vacuum, said container having a perforable stopper and a protruding flame-sealed tubular member of glass having a low coefficient of thermal expansion of the order of that of Pyrex glass communicating with the interior thereof, said member having an internal bore of at least 3.0 mm.

12. As a new article of manufacture, a sealed evacuated container containing lyophilic biologically active substances produced therein and resulting from and having the properties of products produced by rapidly freezing the liquid biological substance to a low temperature and dehydrating the frozen product without melting under a high vacuum, said evacuated container containing the lyophilic material uncontaminated by moisture, micro-organisms and other substances at any time after the freezing of the material and the sealing of the product under a vacuum, said container containing up to about 50 cc. of material and having a capacity of about twice the volume of material and having a protruding flame-sealed tubular member having a low coefficient of thermal expansion of the order of that of Pyrex glass communicating with the interior thereof, said extension having an internal bore of at least 3.0 mm.

13. The improvement in the container of claim 10 in which the container contains amounts of from 25 to 50 cc. of material in a container approximately twice the volume of the material and in which the sealed tube has a bore of about 4.0 mm. or larger.

14. As a new article of manufacture, a small sealed evacuated container containing a solid, lyophilic biologically active substance, said evacuated container containing the lyophilic material uncontaminated by moisture micro-organisms and other substances, said container being provided with a perforable stopper and with a protruding flame-sealed tubular member of glass having a low coefficient of thermal expansion of the order of that of Pyrex glass.

15. A container for desiccated biologically active substances in the form of a glass bottle or vessel having an opening, a rubber stopper in said opening, a fixed glass tubular extension extending from said bottle or vessel, said tubular extension being open at the end extending into said bottle or vessel and sealed at the end protruding from said bottle or vessel, said stopper having a passage extending from the bottom thereof to a place near the top, providing an easily perforable portion of said stopper, said container being evacuated and containing biologically active substances.

16. A container for desiccated biologically active substances in the form of a glass bottle or vessel having an opening, a rubber stopper in said opening, a fixed glass tubular extension extending from said bottle or vessel, said tubular extension being open at the end extending into said bottle or vessel and sealed at the end protruding from said bottle or vessel, said container being evacuated and containing biologically active substances.

17. A container for desiccated biologically active substances in the form of a glass bottle or vessel having a neck, a rubber stopper in said neck, a fixed glass tubular extension extending from said bottle or vessel, said tubular extension being sealed at the end protruding from said bottle or vessel, said container being evacuated and containing biologically active substances.

EARL W. FLOSDORF.